United States Patent
Kunieda et al.

(10) Patent No.: US 9,907,108 B2
(45) Date of Patent: Feb. 27, 2018

(54) COMMUNICATION SYSTEM AND COMMUNICATION METHOD

(71) Applicants: Takayuki Kunieda, Tokyo (JP); Tatsuo Miyachi, Tokyo (JP); Yoshikazu Azuma, Tokyo (JP)

(72) Inventors: Takayuki Kunieda, Tokyo (JP); Tatsuo Miyachi, Tokyo (JP); Yoshikazu Azuma, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 155 days.

(21) Appl. No.: 14/485,217

(22) Filed: Sep. 12, 2014

(65) Prior Publication Data

US 2015/0078362 A1    Mar. 19, 2015

(30) Foreign Application Priority Data

Sep. 17, 2013   (JP) ................................. 2013-191890
Sep. 1, 2014    (JP) ................................. 2014-177518

(51) Int. Cl.
| | |
|---|---|
| H04W 4/00 | (2009.01) |
| H04W 76/02 | (2009.01) |
| H04W 76/04 | (2009.01) |
| H04W 92/20 | (2009.01) |

(52) U.S. Cl.
CPC ......... *H04W 76/028* (2013.01); *H04W 76/04* (2013.01); *H04W 76/045* (2013.01); *H04W 92/20* (2013.01)

(58) Field of Classification Search
CPC .. H04W 24/00; H04W 12/08; H04L 12/4625; H04L 63/0876

USPC .................................................. 370/338, 389
See application file for complete search history.

(56) References Cited

U.S. PATENT DOCUMENTS

| | | | | |
|---|---|---|---|---|
| 7,526,671 | B2 * | 4/2009 | Kawamoto ......... | G06F 11/1076 709/223 |
| 2002/0191575 | A1 * | 12/2002 | Kalavade ................ | H04L 63/08 370/338 |
| 2003/0016844 | A1 * | 1/2003 | Numaoka ............... | G06T 17/00 382/100 |
| 2004/0105415 | A1 * | 6/2004 | Fujiwara ................ | H04W 24/00 370/338 |
| 2007/0206216 | A1 | 9/2007 | Sakagami et al. | |
| 2009/0305671 | A1 * | 12/2009 | Luft .................... | G06Q 30/0205 455/411 |
| 2011/0143795 | A1 * | 6/2011 | Nunokawa .......... | H04W 72/082 455/507 |
| 2012/0044935 | A1 * | 2/2012 | Hama .................. | H04L 12/4625 370/389 |

(Continued)

FOREIGN PATENT DOCUMENTS

| | | |
|---|---|---|
| JP | 2007-235713 | 9/2007 |
| JP | 2012-108872 | 6/2012 |

*Primary Examiner* — Kevin C Harper
(74) *Attorney, Agent, or Firm* — Harness, Dickey & Pierce, P.L.C.

(57) ABSTRACT

In the present invention, a connection controller controls opening/closing of connection between a first communication unit that communicates with a terminal device and a second communication unit that communicates via a network. A connection setting unit instructs opening/closing of the connection to the connection controller in accordance with a user input received by an input unit in accordance with first identification information output from the terminal device displayed on a display unit.

21 Claims, 12 Drawing Sheets

(56) References Cited

U.S. PATENT DOCUMENTS

| | | |
|---|---|---|
| 2012/0098733 A1 | 4/2012 | Masuda et al. |
| 2013/0070284 A1 | 3/2013 | Sakagami et al. |
| 2016/0066219 A1* | 3/2016 | Poikonen ................ H04W 8/12 |
| | | 455/436 |

* cited by examiner

COMMUNICATION SYSTEM AND COMMUNICATION METHOD

CROSS-REFERENCE TO RELATED APPLICATIONS

The present application claims priority to and incorporates by reference the entire contents of Japanese Patent Application No. 2013-191890 filed in Japan on Sep. 17, 2013 and Japanese Patent Application No. 2014-177518 filed in Japan on Sep. 1, 2014.

BACKGROUND OF THE INVENTION

1. Field of the Invention

The present invention relates to a communication system and a communication method that enable easy connection from an external device to a secure local area network (LAN).

2. Description of the Related Art

In recent years, it is generally practiced that a local area network (LAN) is established inside an organization such as a corporation and various information processing devices used inside the organization are connected to each other via the LAN (hereinafter, referred to as an internal LAN). It is also generally practiced that a wireless LAN for wireless communication is further established in the internal LAN and information processing devices used by each member belonging to the organization are connected to the internal LAN via the wireless LAN so that various devices such as a multifunction peripheral (MFP) and a projector device that are connected to the internal LAN can be used from the information processing devices used by each member.

In the internal LAN and the wireless LAN connected thereto as described above, it is general that authentication processing is performed for an external information processing device to be connected and various devices connected to the internal LAN can be used from the external information processing device once the authentication has been succeeded. Japanese Patent Application Laid-open No. 2007-235713 discloses a technique that enables utilization of an MFP connected to a network by performing authentication with unique user information and the Active Directory.

A case will be considered where a user outside the organization uses a device (a projector device, for example) connected to the internal LAN. In most cases, from a security point of view, an information processing device used by a user outside the organization cannot be connected to the internal LAN. It has been thus inconvenient for a user outside the organization because the user cannot use a device inside the organization via the internal LAN from an information processing device used by the user or is obliged to use a legacy connection to use the device inside the organization.

Conventionally, when a user outside the organization attempts to use a projector device inside the organization, for example, there has been an inconvenience that the user has to use a legacy connection such as a video graphics array (VGA) or a digital visual interface (DVI) and take time to prepare a connection cable therefor.

As a method for permitting a user outside the organization to temporarily connect to the LAN, a dedicated guest network may be established. However, this has not been easy because in order to perform this method, reconstruction and resetting are necessary at the level of network design and operation, such as logical partitioning of the network using a virtual LAN (VLAN), for example. There has also been a problem that the method is ineffective in view of costs and power consumption because the use frequency of a guest network is generally low and the network hardly used must be kept established for guests only.

Furthermore, with a wireless LAN provided for guests only, there is an operation burden that each setting must be notified to the user outside. The method is thus frequently used with no security setting or a password that can be notified orally or by handwriting in actual cases. This has posed a problem that the wireless LAN communication performed by a guest terminal is exposed to a security threat such as a wiretap.

In view of the above circumstance, there is a need to make it possible to easily connect an information processing device of a user outside an organization to a network inside the organization with security ensured.

SUMMARY OF THE INVENTION

It is an object of the present invention to at least partially solve the problems in the conventional technology.

According to the present invention, there is provided a communication system comprising: a first communication unit that communicates with a terminal device; a second communication unit that communicates via a network; a connection controller that controls opening/closing of connection between the first communication unit and the second communication unit; a display unit that displays first identification information output from the terminal device; an input unit that receives a user input; and a connection setting unit that instructs opening/closing of the connection to the connection controller in accordance with the user input received by the input unit in accordance with the display.

The present invention also provides a communication method comprising: first communicating that communicates with a terminal device; second communicating that communicates via a network; connection controlling that controls opening/closing of connection between the terminal device and the network; displaying that displays first identification information output from the terminal device; receiving that receive a user input; and connection setting that instructs opening/closing of the connection with respect to the connection controlling in accordance with the user input received at the receiving in accordance with the display.

The present invention also provides a communication system comprising: a connection device; and an authentication device, wherein the connection device includes a first communication unit that communicates with a terminal device via a first network; a second communication unit that communicates via a second network; a connection controller that controls opening/closing of connection between the first communication unit and the second communication unit; and an identification information storage unit that stores therein first identification information output from the terminal device and received by the first communication unit via the first network, and the authentication device includes a display unit that displays information; an input unit that receives a user input; and a connection setting unit that communicates with the connection device via the second network, acquires the first identification information from the identification information storage unit to cause the display unit to display the acquired first identification information, and instructs opening/closing of the connection to the connection controller in accordance with an input made to the input unit in accordance with the displayed first identification information.

The present invention also provides a communication method comprising: first communicating that communicates with a terminal device via a first network; second communicating that communicates via a second network; connection controlling that controls opening/closing of connection between the first network and the second network; storing that stores identification information output from the terminal device and received at the first communicating via the first network in an identification information storage unit; and connection setting that communicates via the second network, acquires the identification information from the identification information storage unit to cause a display unit to display the acquired identification information, and instructs opening/closing of the connection at the connection controlling in accordance with a user input made to an input unit in accordance with the displayed identification information.

The present invention also provides a communication system comprising: a first input unit that receives an input of identification information; a retrieval unit that retrieves a connection device controlling opening/closing of connection between a first network and a second network via the first network; a transmitting unit that transmits, via the first network, the identification information input to the first input unit to the connection device retrieved by the retrieval unit; an acquiring unit that acquires, via the second network, the identification information transmitted to the connection device; a display unit that displays the identification information acquired by the acquiring unit; a second input unit that receives a user input in accordance with the identification information displayed on the display unit; and a connection setting unit that instructs opening/closing of the connection to the connection device in accordance with the user input made to the second input unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of a communication system and a communication method will be described below in detail with reference to the accompanying drawings.

Configuration Common to Each Embodiment

Figure 1:
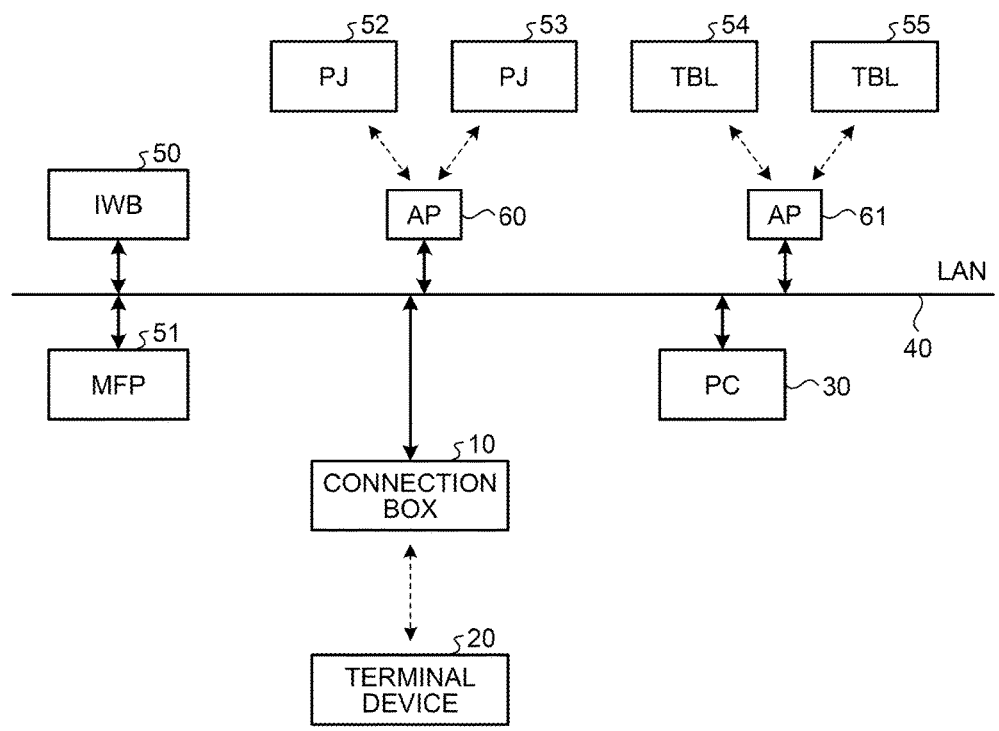
FIG. 1 is a diagram illustrating the configuration of an example of a network system applicable to each embodiment of the present invention.

FIG. 1 is a diagram illustrating the configuration of an example of a network system applicable to each embodiment. A local area network (LAN) 40 is a network system performing communication using Transmission Control Protocol/Internet Protocol (TCP/IP), for example, as a protocol, which is an internal LAN formed in a closed manner inside an organization such as a corporation. To the LAN 40, a plurality of devices such as the Interactive Whiteboard (IWB) 50, a multifunction peripheral (MFP) 51, a personal computer (PC) 30 are connected to each other in a communicable manner.

To the LAN 40, access points (AP) 60 and 61 using a wireless LAN compliant with the Institute of Electrical and Electronics Engineers (IEEE) 802.11 standard are further connected. Hereinafter, a wireless LAN compliant with this IEEE 802.11 standard is referred to as Wi-Fi (registered trademark), the name of a certification of interoperability certified by the Wi-Fi Alliance, which is an industrial association related to IEEE 802.11 devices. In the example in FIG. 1, the AP 60 can communicate with Wi-Fi-compliant projector devices (PJ) 52 and 53. The AP 61 can communicate with Wi-Fi-compliant tablet terminals (TBL) 54 and 55 in the same manner.

In the configuration described above, via the LAN 40, information such as an image transmitted from the PC 30 can be displayed on the IWB 50 and can be output by the MFP 51. Via the LAN 40 and the AP 60, information such as an image transmitted from the PC 30 can also be projected by the PJs 52 and 53 on a screen (not illustrated). Information transmitted from the TBLs 54 and 55 can be transferred to the LAN 40 via the AP 61 to be provided to the PC 30. Information, such as images, transmitted from the TBLs 54 and 55 can be transferred to the LAN 40 via the AP 61 to be further provided to the IWB 50 and the MFP 51.

Each of the PC 30, the IWB 50 and the MFP 51, the PJs 52 and 53, and the TBLs 54 and 55 that are directly or indirectly connected to the LAN 40 is authenticated inside the organization by the network system including the LAN 40. In other words, an information processing device such as a PC outside the organization has to be authenticated inside the organization to perform communication via the LAN 40.

To the LAN 40, a connection box 10 according to each embodiment is also connected by wire, for example. The connection box 10 is authenticated inside the organization by the network system including the LAN 40. Communication can be performed with various devices such as the PC 30 that are connected to the LAN 40 from the connection box 10 via the LAN 40.

The connection box 10 further has the function as a Wi-Fi access point, for example. With this access point function, the connection box 10 can perform communication wirelessly with a terminal device 20 that is a device outside the organization and not authenticated by the network system including the LAN 40, for example.

The connection box 10 can control the opening/closing of the connection between the terminal device 20 and the LAN 40 that are connected by wireless communication, in accordance with an instruction from outside. The terminal device 20 is thus connected to the LAN 40 to be able to communicate with various devices connected to the LAN 40 only when an instruction to close the connection with the LAN 40 is given to the connection box 10 from outside.

Figure 2:
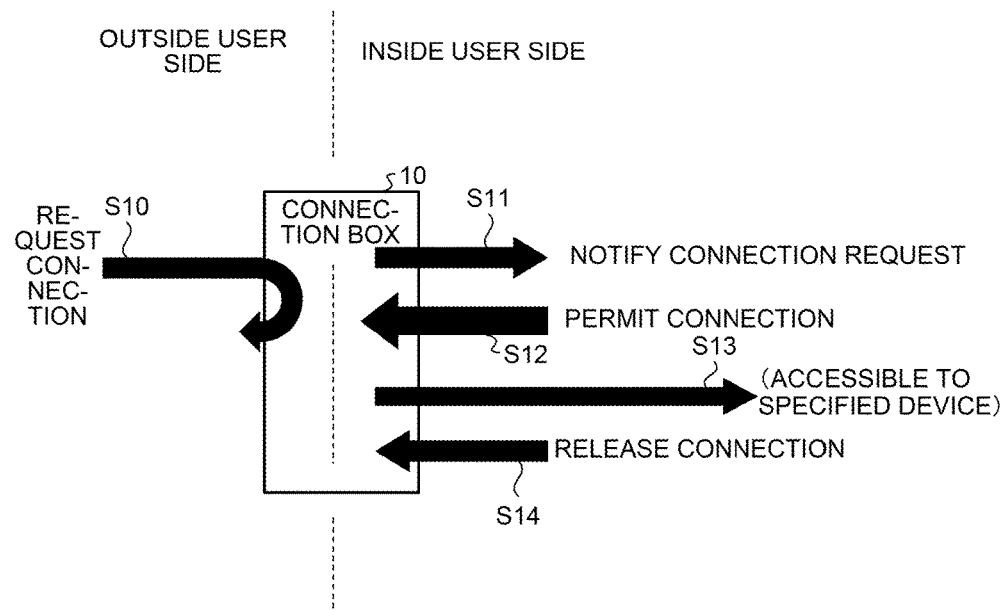
FIG. 2 is a schematic diagram illustrating a procedure of connecting a terminal device and a local area network (LAN) using a connection box common to each embodiment.

FIG. 2 is a schematic diagram illustrating a procedure of connecting the terminal device 20 and the LAN 40 using the connection box 10 common to each embodiment. In FIG. 2, the terminal device 20 is indicated as an outside user side considered as a user outside the organization, and the LAN 40 is indicated as an inside user side considered as a user inside the organization. The inside user side accesses the connection box 10 from the PC 30, for example.

Prior to the start of the processing illustrated in FIG. 2, identification information for the inside user side to authenticate the outside user side is communicated from the inside user side to the outside user side in some way. In each embodiment, a user on the inside user side directly notifies a user on the outside user side of the identification information. The method for notification of the identification information is not limited and may include an oral message and a memorandum. E-mail may be used for notification of the identification information. The notification of the identification information is performed each time the terminal device 20 is to be connected to the LAN 40.

Firstly, the terminal device 20 and the connection box 10 are connected by Wi-Fi wireless communication. A service set identifier (SSID) necessary for identifying the access point function of the connection box 10 is given in advance from the inside user side to the outside user side. The access point function of the connection box 10 does not necessarily require encryption with a wired equivalent privacy (WEP) key or any other encryption key.

At Step S10 in FIG. 2, a connection request is transmitted from the terminal device 20 to the connection box 10. In this process, the user on the outside user side inputs the identification information given from the inside user side in advance to the terminal device 20. The terminal device 20 adds this identification information to the connection request, and transmits the connection request to the connection box 10.

At Step S11, the connection box 10 notifies the inside user side of the connection request and the identification information from the terminal device 20. For example, the connection box 10 transmits the connection request and the identification information from the terminal device 20 to the PC 30. The PC 30 receives the connection request and the identification information and causes a display of the PC 30 to display the identification information.

At this point of time, the connection box 10 maintains the connection between the terminal device 20 and the LAN 40 open. The connection box 10 thus forwards the connection request and the identification information via a memory or any other medium from the terminal device 20 to the LAN 40, for example.

On the inside user side, the user on the inside user side checks the identification information displayed on the display of the PC 30, so that the user on the inside user side can determine whether or not the identification information is correct. Upon determining that the identification information is correct, the user on the inside user side notifies the connection box 10 of a connection permission at Step S12. For example, the user on the inside user side inputs connection permission information indicating the connection permission to the PC 30. The PC 30 transmits the input connection permission information to the connection box 10.

Upon receiving the connection permission information, the connection box 10 closes the connection between the terminal device 20 and the LAN 40. With this process, the terminal device 20 is connected to the LAN 40 via the connection box 10. Because the connection box 10 is authenticated by the LAN 40, the terminal device 20 now can access various devices connected to the LAN 40 via the connection box 10 (Step S13).

A device to which the outside user side can connect may be stored in advance in the connection box 10. With reference to FIG. 1, when the IWB 50 and the PJ 52 are permitted to be accessed from the outside user side, for example, the connection box 10 stores therein the internet protocol (IP) addresses of these IWB 50 and PJ52 as connection destination information.

When the inside user side expressly refuses the access from the terminal device 20 to the LAN 40, or when the inside user side stops accessing the connection box 10, the connection box 10 releases the connection from the outside user side (Step S14). For example, the user on the inside user side who has permitted the connection from the terminal device 20 makes a request from the PC 30 to the connection box 10 to release the connection from the terminal device 20. Following this request, the connection box 10 opens the connection between the terminal device 20 and the LAN 40 to release the connection from the terminal device 20 to the LAN 40.

As described above, in each embodiment, control of the connection between the terminal device 20 outside the organization and the LAN 40 inside the organization is performed via the connection box 10. Furthermore, it is configured such that a person inside the organization can determine whether or not to permit the connection between the terminal device 20 and the LAN 40, based on the pre-notified identification information input by the person outside the organization. With this configuration, the terminal device 20 can be easily connected to the LAN 40. Furthermore, this configuration can prevent malicious invasion into the LAN 40 from outside the organization.

First Embodiment

Figure 3:
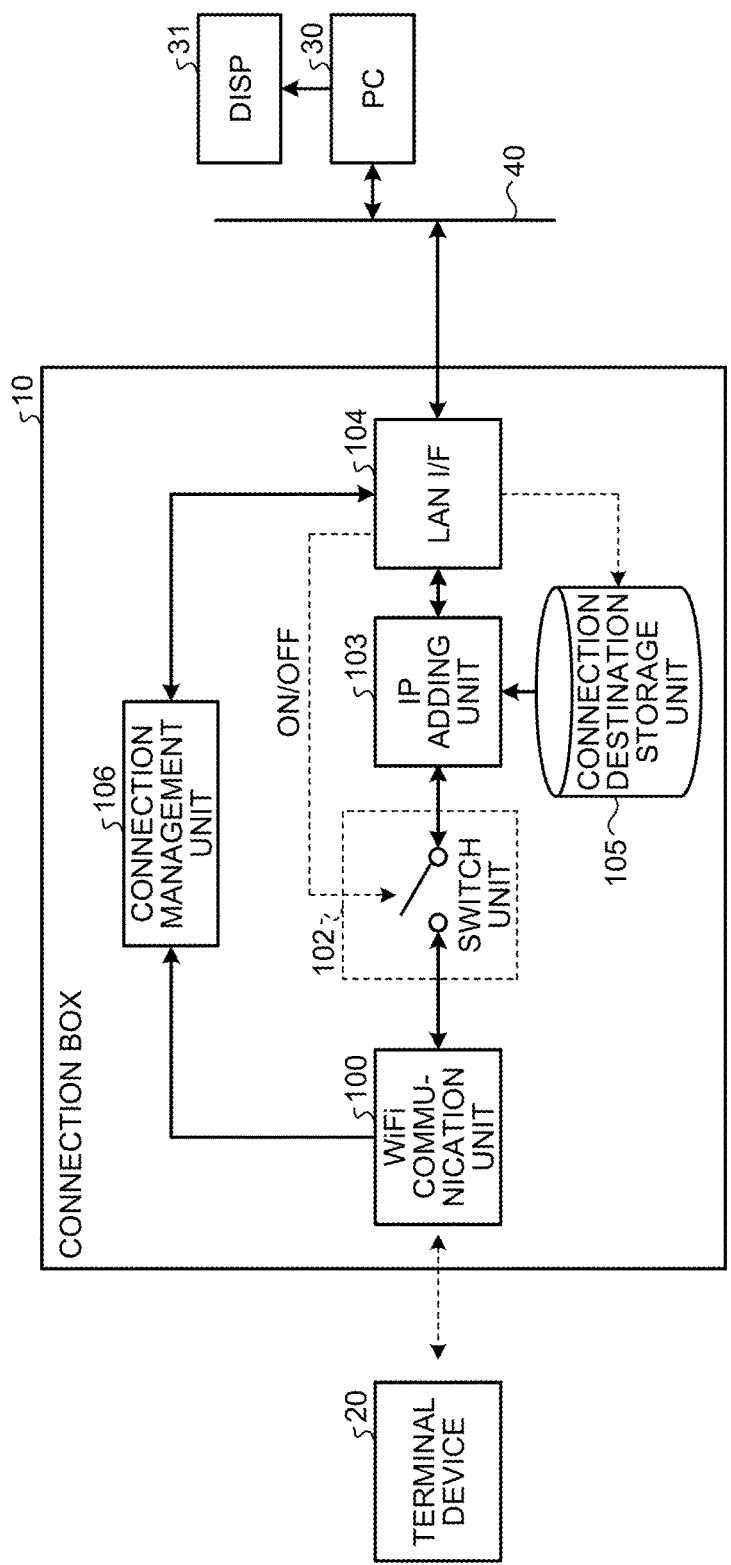
FIG. 3 is a block diagram illustrating the configuration of an example of the connection box according to a first embodiment.

Next, the connection performed via the connection box 10 will be described in more details. FIG. 3 illustrates the configuration of an example of the connection box 10a according to a first embodiment. In FIG. 3, the connection box 10a includes a Wi-Fi communication unit 100, a switch (SW) unit 102, an IP adding unit 103, a LAN interface (I/F)

104, an connection destination storage unit 105, and a connection management unit 106.

The Wi-Fi communication unit 100 has the Wi-Fi access point function to perform Wi-Fi wireless communication. The Wi-Fi communication unit 100 is identified by a predefined service set identifier (SSID). Once the Wi-Fi communication unit has been detected, the terminal device 20 transmits the SSID set to the Wi-Fi communication unit 100 to the Wi-Fi communication unit 100, thereby establishing connection with the Wi-Fi communication unit 100.

Once the connection with the Wi-Fi communication unit 100 has been established as described above, the terminal device 20 transmits the identification information input by the user outside to the Wi-Fi communication unit 100. The Wi-Fi communication unit 100 outputs the received identification information to the connection management unit 106. The connection management unit 106 is a memory, for example, and stores therein the identification information output by the Wi-Fi communication unit 100.

After the connection with the terminal device 20 is established, the Wi-Fi communication unit 100 outputs communication data transmitted from the terminal device 20 to the IP adding unit 103 via the switch unit 102. Whether the data transmitted from the terminal device 20 is identification information or other communication data may be determined based on an identifier, for identifying the content of the data, that is embedded into the data transmitted from the terminal device 20, for example.

In the first embodiment, the Wi-Fi communication unit 100 does not have a WEP key or involve encryption by WEP. It should be appreciated that a WEP key or other encryption keys may be set to encrypt a communication packet in Wi-Fi communication, in the same manner as with a general Wi-Fi access point function.

The IP adding unit 103 adds an IP address stored in the connection destination storage unit 105, as information indicating a connection destination, to the communication data supplied from the Wi-Fi communication unit 100. The connection destination storage unit 105 stores therein in advance the IP address of the connection destination with which the terminal device 20 is permitted to connect by communication via the connection box 10a. The IP address supplied from the connection destination storage unit 105 to the IP adding unit 103 can be set or changed by an external instruction such as from the PC 30. The connection box 10a may be provided with a unit for setting or switching IP addresses.

In FIG. 3, the IP adding unit 103, the connection destination storage unit 105, and the connection management unit 106 are embedded in the connection box 10a. However, the embodiment is not limited to this example. For example, all or part of the IP adding unit 103, the connection destination storage unit 105, and the connection management unit 106 may be separated from the connection box 10a and operated in cooperation with the connection box 10a in the form of a server connected to the LAN 40.

The LAN I/F 104 controls communication with the LAN 40. The LAN I/F 104 further performs operations such as acquisition of identification information stored in the connection management unit 106, control of the closing/opening (on/off) of the switch unit 102, and switching of IP addresses supplied from the connection destination storage unit 105 to the IP adding unit 103, in accordance with the request from the PC 30.

Upon acquiring identification information from the connection management unit 106, the LAN I/F 104 transmits the acquired identification information to the PC 30. The PC 30 receives the transmitted identification information from the connection box 10a and causes a display (DISP) 31 to display the transmitted identification information.

Figure 4:
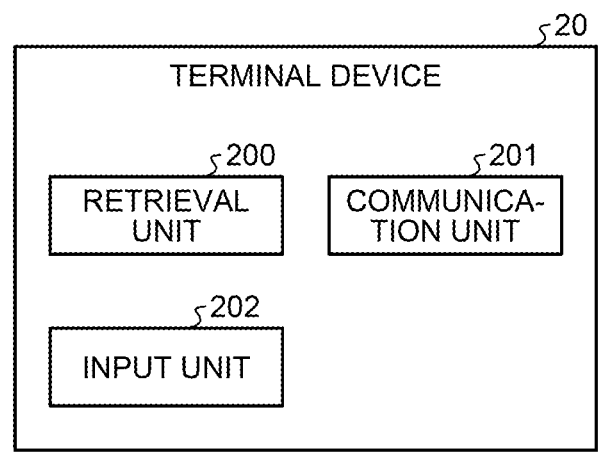
FIG. 4 is a functional block diagram of an example for explaining the function of the terminal device according to the first embodiment.

FIG. 4 is a functional block diagram of an example for explaining the function of the terminal device 20 according to the first embodiment. The terminal device 20 includes a retrieval unit 200, a communication unit 201, and an input unit 202. All or part of the retrieval unit 200, the communication unit 201, and the input unit 202 are configured with a computer program operating on a central processing unit (CPU). The configurations of the retrieval unit 200, the communication unit 201, and the input unit 202 are not limited to this. The retrieval unit 200, the communication unit 201, and the input unit 202 may be each configured with an individual hardware operating in cooperation with each other.

The retrieval unit 200 retrieves a Wi-Fi access point when communication is performed by the communication unit 201. The communication unit 201 establishes connection with the access point retrieved by the retrieval unit 200 and performs communication with the access point with which the connection has been established. The input unit 202 causes a display unit (not illustrated) to display a screen containing a message prompting an input of identification information and forwards the identification information input in accordance with this screen to the communication unit 201. When the communication unit 201 transmits the identification information input to the input unit 202, the communication unit 201 embeds, in transmitted data, an identifier indicating, for example, that the identification information is included.

Figure 5:
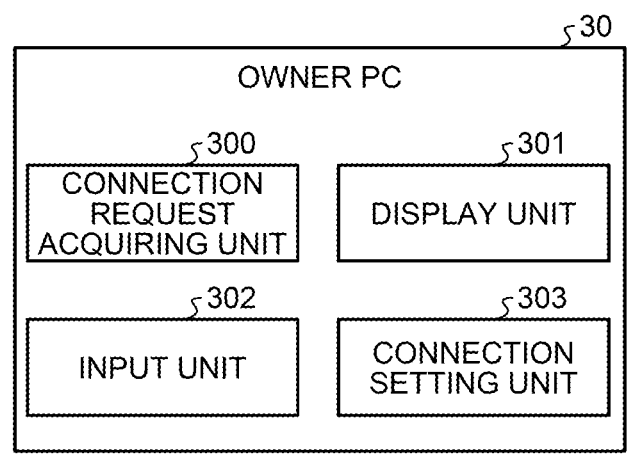
FIG. 5 is a functional block diagram of an example for explaining the function of a personal computer (PC) used on an inside user side to instruct permission for connection of a device on an outside user side according to the first embodiment.

FIG. 5 is a functional block diagram of an example for explaining the function of the PC 30 used on the inside user side to instruct the connection box 10a to permit connection of a device on the outside user side according to the first embodiment. It should be noted that the PC 30 is indicated as an "OWNER PC" in FIG. 5. The PC 30 includes a connection request acquiring unit 300, a display unit 301, an input unit 302, and a connection setting unit 303. Each of the connection request acquiring unit 300, the display unit 301, the input unit 302, and the connection setting unit 303 includes a computer program operating on a CPU.

The connection request acquiring unit 300 acquires identification information input into the terminal device 20 and transmitted from the connection box 10a. The display unit 301 generates a display screen that displays the identification information acquired by the connection request acquiring unit 300 and a message prompting an input on whether to permit connection from the terminal device 20. The input unit 302 receives an input in accordance with the display screen. The connection setting unit 303 instructs the connection box 10a to open/close the switch unit 102 in accordance with the input made to the input unit 302 in accordance with the display screen.

Figure 6:
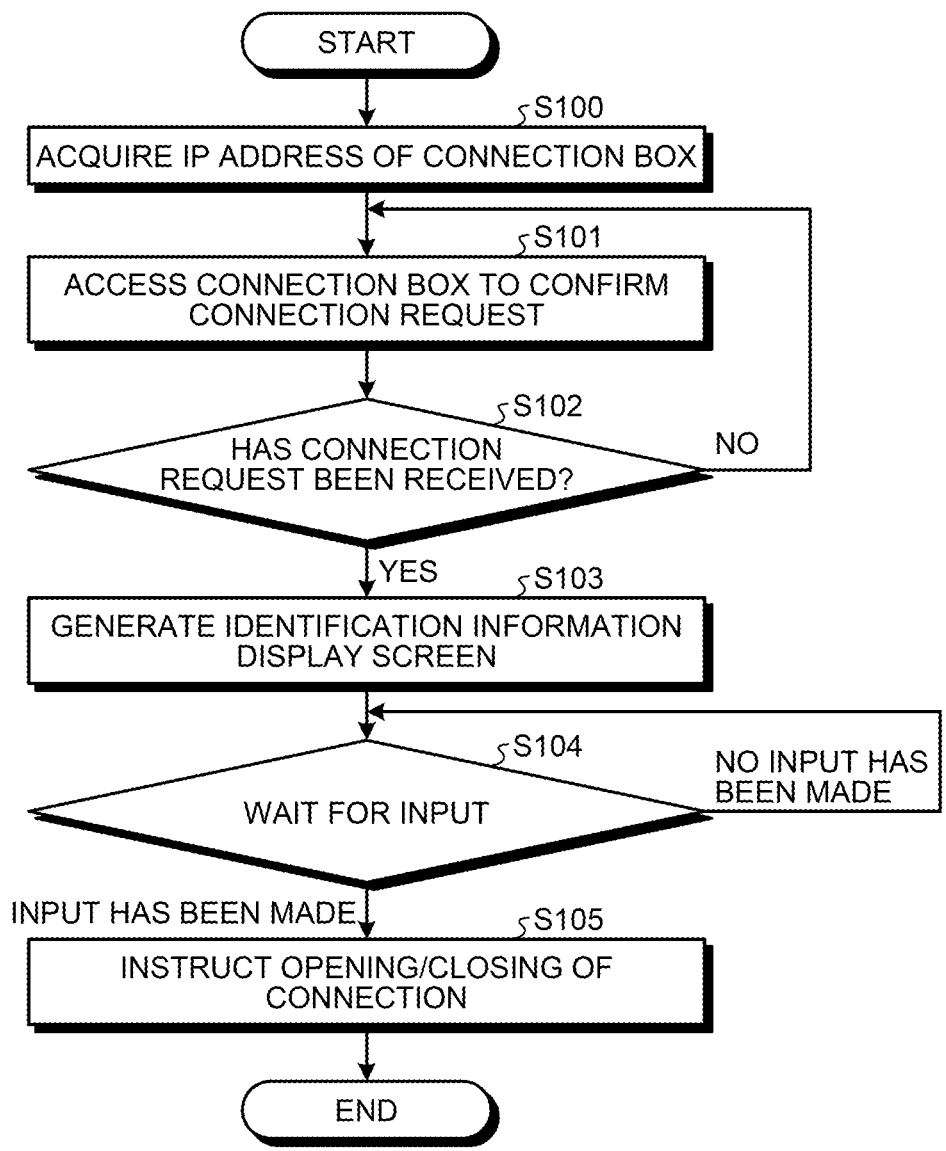
FIG. 6 is a flowchart illustrating an example of processing of permitting connection to the connection box in the PC according to the first embodiment.

FIG. 6 is a flowchart illustrating an example of processing by the PC 30 of permitting connection to the connection box 10a according to the first embodiment. This processing in the flowchart is performed by a computer program operating on the CPU of the PC 30.

Once the connection box 10a has been connected to the LAN 40, the PC 30 acquires the IP address of the connection box 10a from the network system including the LAN 40 (Step S100). Next, at Step S101, the PC 30 accesses the connection box 10a in accordance with the acquired IP address to confirm presence or absence of a connection request from the terminal device 20. When the PC 30 determines that no connection request has been received by the connection box 10*a* at Step S102, the PC 30 returns the processing to Step S101.

More specifically, the connection request transmitted with identification information added thereto from the terminal device 20 is stored in the connection management unit 106 in the connection box 10*a*. The PC 30 makes an inquiry on presence or absence of a connection request to the connection box 10*a* at Step S101. In response to this inquiry, the connection box 10 determines whether or not a connection request is stored in the connection management unit 106 and notifies the PC 30 of the result of the determination.

When the PC 30 determines that a connection request has been received by the connection box 10*a* at Step S102, the PC 30 moves the processing to Step S103. At Step S103, the PC 30 acquires from the connection box 10*a* the identification information added to the connection request transmitted from the terminal device 20, generates an identification information display screen for confirming the identification information, and causes the display 31 to display the generated identification information display screen.

For example, at Step S103, the PC 30 requests the identification information added to the connection request to the connection box 10*a*. The connection box 10*a* acquires from the connection management unit 106 the identification information added to the connection request transmitted from the terminal device 20, and transmits the acquired identification information to the PC 30. The PC 30 generates a display screen for displaying this identification information and a message prompting an input of an instruction on whether or not to permit connection from the terminal device 20, and causes the display 31 to display the generated display screen.

At next Step S104, the PC 30 waits for the input of the instruction on whether or not to permit connection from the terminal device 20 by the inside user. Once the instruction on whether or not to permit connection of the terminal device 20 has been input by the inside user, the PC 30 shifts the processing to Step S105 and instructs the connection box 10*a* to open/close connection by the switch unit 102 in accordance with the input instruction.

More specifically, when the inside user authenticates the identification information displayed on the identification information display screen on the display 31, the inside user inputs the instruction to the PC 30 to close (turn ON) the connection between the terminal device 20 and the LAN 40. The PC 30 transmits this instruction to the connection box 10*a*. Once receiving this instruction, the LAN I/F 104 of the connection box 10*a* outputs a signal to close (turn ON) the connection to the switch unit 102.

Figure 7:
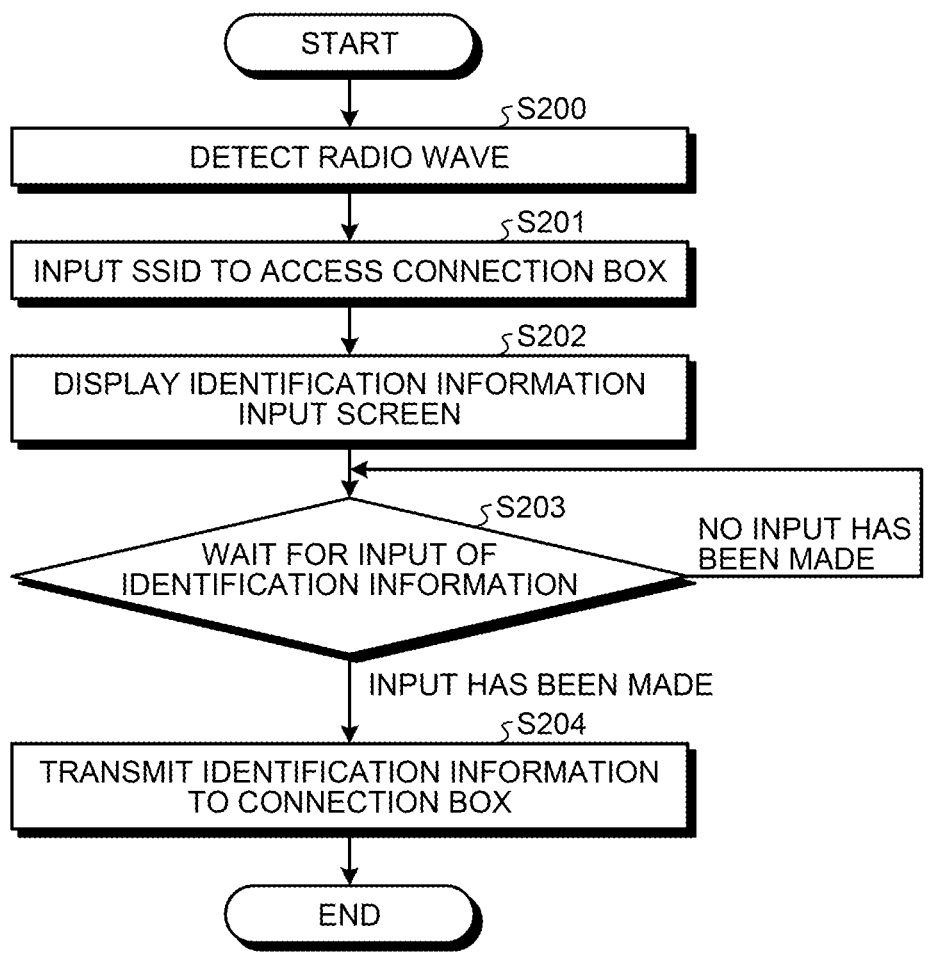
FIG. 7 is a flowchart illustrating an example of processing of requesting connection to the LAN performed by the terminal device according to the first embodiment.

FIG. 7 is a flowchart illustrating an example of processing of requesting connection to the LAN 40 performed by the terminal device 20 according to the first embodiment. At Step S200, the terminal device 20 detects a Wi-Fi radio wave transmitted from the Wi-Fi communication unit 100 of the connection box 10*a*. Once the radio wave from the Wi-Fi communication unit 100 has been detected, the processing shifts to next Step S201. At Step S201, the outside user inputs, to the terminal device 20, the SSID of the connection box 10*a* (the Wi-Fi communication unit 100) that has been notified in advance. The terminal device 20 transmits the input SSID to the connection box 10*a* to access the connection box 10*a*.

At next Step S202, the terminal device 20 generates an identification information input screen prompting the outside user to input the identification information and causes a display (not illustrated) included in the terminal device 20 to display the identification information input screen. The terminal device 20 then waits for the input of the identification information performed by the outside user at next Step S203. Once the identification information has been input by the outside user, the processing shifts to Step S204.

At Step S204, the terminal device 20 transmits the identification information input by the outside user to the connection box 10. In this process, the terminal device 20 adds the identification information to the connection request requesting the connection to the LAN 40, and transmits the connection request to the connection box 10*a*. The transmitted identification information added to the connection request is authenticated by the inside user with the PC 30, whereby the switch unit 102 of the connection box 10*a* is closed to connect the terminal device 20 and the LAN 40.

When the connection of the terminal device 20 to the LAN 40 is terminated, the connection box 10*a* opens (turns OFF) the switch unit 102, deletes the identification information stored in the connection management unit 106, and further initializes the Wi-Fi communication unit 100.

In the explanation above, a WEP key is used for the security of the wireless LAN communication in the network system illustrated in FIG. 1. However, the embodiment is not limited to this example. More specifically, Wi-Fi Protected Access (WPA) or WPA2 produced by extending WPA may be used for the security of the wireless LAN communication in the network system illustrated in FIG. 1. Even in this case, in the first embodiment, the Wi-Fi communication unit 100 does not have any security settings using WPA or involve encryption by WPA. Naturally, security settings may be made using WPA in the Wi-Fi communication unit 100 and connection authentication and encryption of communication packets may be performed for communication.

Modification of the First Embodiment

Figure 8:
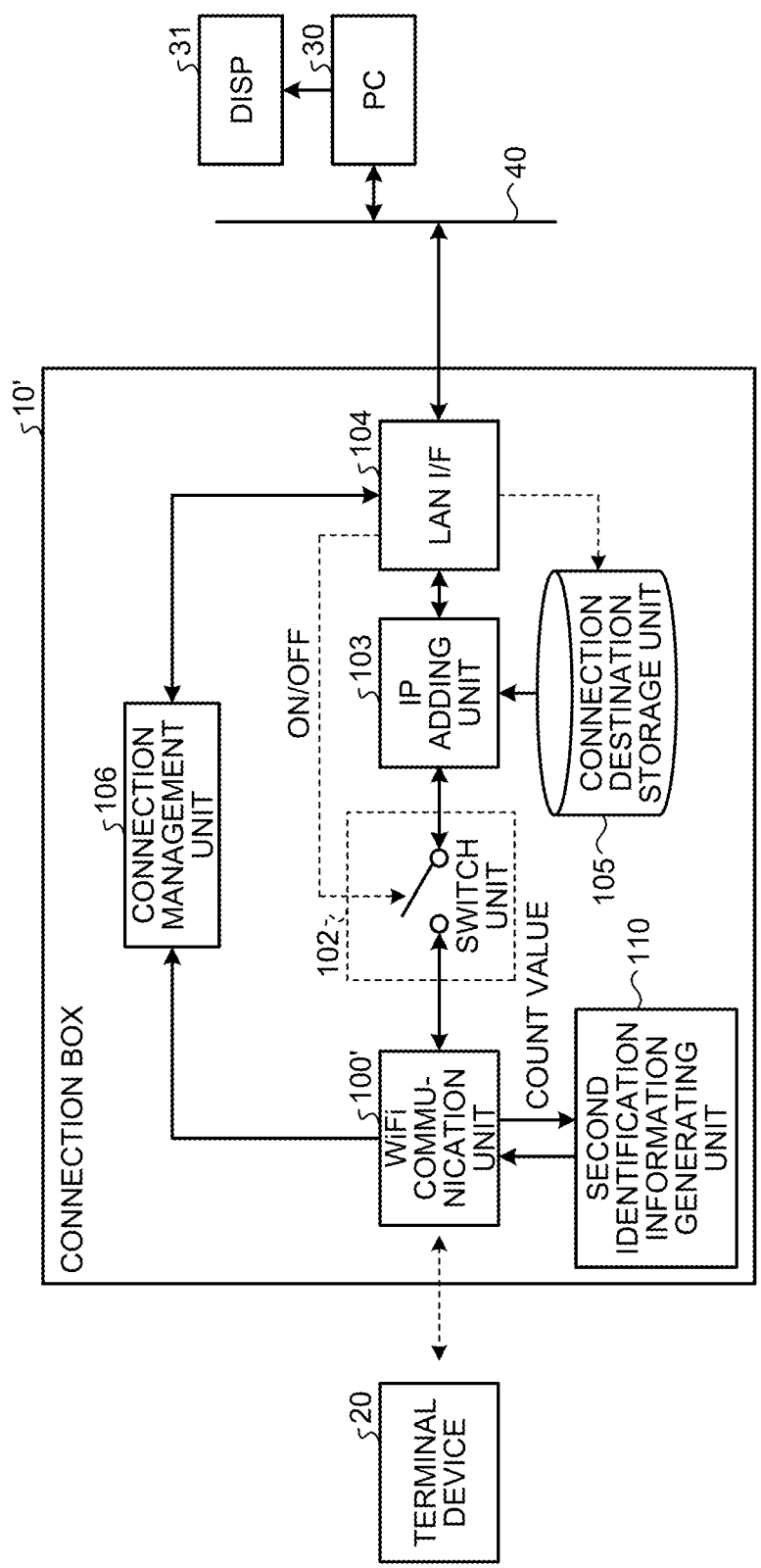
FIG. 8 is a diagram illustrating the configuration of an example of a connection box according to a modification of the first embodiment.

Next, a modification of the first embodiment will be described. FIG. 8 illustrates the configuration of an example of a connection box 10*b* according to a modification of the first embodiment. The connection box 10*a* according to the first embodiment described above is assumed to enable connection of a single terminal device 20; while the connection box 10*b* according to the modification of the first embodiment enables connection of a plurality of terminal devices 20. It should be noted that, in FIG. 8, components in common with those in FIG. 3 described above are denoted with the same numerals and detailed descriptions thereof are omitted.

In the connection box 10*b* illustrated in FIG. 8, a Wi-Fi communication unit 100' has the function of outputting a count value to be incremented each time connection is established with different terminal devices 20, in addition to the function of the Wi-Fi communication unit 100 described above. Furthermore, the connection box 10*b* in FIG. 8 includes a second identification information generating unit 110 in addition to the components of the connection box 10*a* illustrated in FIG. 3. The second identification information generating unit 110 generates different pieces of second identification information in accordance with the count value output from the Wi-Fi communication unit 100'.

From the terminal device 20 that has input an SSID to establish connection with the Wi-Fi communication unit 100', the Wi-Fi communication unit 100' acquires an identifier unique to each terminal device 20, such as a media access control (MAC) identifier. If the Wi-Fi communication unit 100' has acquired an identifier different from that of the terminal device 20 with which connection has already been established, the Wi-Fi communication unit 100' increments the count value.

The second identification information generating unit 110 generates second identification information in accordance with the count value output from the Wi-Fi communication unit 100' and forwards the generated second identification information to the Wi-Fi communication unit 100'. The Wi-Fi communication unit 100' associates identification information (as first identification information) transmitted from the terminal device 20 in accordance with an input by the outside user with the second identification information received from the second identification information generating unit 110, and causes the connection management unit 106 to store therein the first identification information and the second identification information associated with each other.

The PC 30 causes the identification information display screen to display the first identification information and the second identification information associated with the first identification information, from the connection management unit 106. With this configuration, the inside user can discriminate a plurality of the terminal devices 20 and can set whether or not to permit connection for each of the terminal devices 20. It should be noted that, in this process, the connection box 10b may supply the setting result indicating whether or not to permit connection of each of the terminal devices 20 to the Wi-Fi communication unit 100' as well and the Wi-Fi communication unit 100' may perform filtering of the transmitted data in accordance with the setting result.

Second Embodiment

Next, a second embodiment of the present invention will be described. In the second embodiment, a concept called Software Defined Network (SDN) is applied to the connection box 10 described above. Prior to explanation of the second embodiment, SDN will be roughly described.

Conventionally, it has been general that a network environment such as an internal LAN formed in a closed manner inside an organization is established by a dedicated specialist who has good knowledge of settings and operations of the LAN switches and wireless LAN access points provided by the vendors. This kind of network environment is in the state of "vendor lock-in", so to speak, in which only authentication means and operation methods based on the solutions of the vendors can be provided. In this situation, it has been difficult for an organization to freely set authentication means and operation methods.

In the recent years, the concept called SDN has been attracting attention, which enables control of data movement on a network only with software so that an organization as a user can establish its original network. In connection with this SDN, representative components of the construction technology attracting attention includes "network virtualization" and "OpenFlow", which is one of the techniques (protocols) of controlling communication on the virtualized network and offers open specifications that do not depend on the vendors.

Network virtualization is the aggregate of techniques including a plurality of components from a virtual interface technique making one physical interface look like a plurality of interfaces (or making a plurality of physical interfaces look like one interface) to a virtual switching technique of relay connection between the virtual interfaces. Network virtualization virtually separates the logical network construction from the physical network construction by the combination of physical network devices, virtual network components, and the protocol techniques to construct a flexible network construction that is not limited by the physical construction.

In OpenFlow, communication is regarded as an end-to-end flow and path control, load distribution, and optimization or the like can be performed in the unit of the flow. More specifically, each data packet is centrally controlled instead of analyzed and transferred in an independent distributed manner at relay devices in the data communication paths, whereby OpenFlow is constructed.

In OpenFlow, a "control plane" is separated from a "data plane". The "control plane" performs data analysis, determination of a transfer destination, and the decision control thereof. The "data plane" is a part that only performs physical transmission of packets. In OpenFlow, an OpenFlow controller (OFC) managing the control plane instructs a transfer rule and an OpenFlow switch (OFS) managing the data plane transfers packets in accordance with the instruction transmitted from the OFC. More specifically, the OFS transfers packets in accordance with a flow table that the OFS has. The flow table is added and rewritten by the OFC. With this system used, OpenFlow can be utilized as a tool for controlling network virtualization described above, for example.

Figure 9:
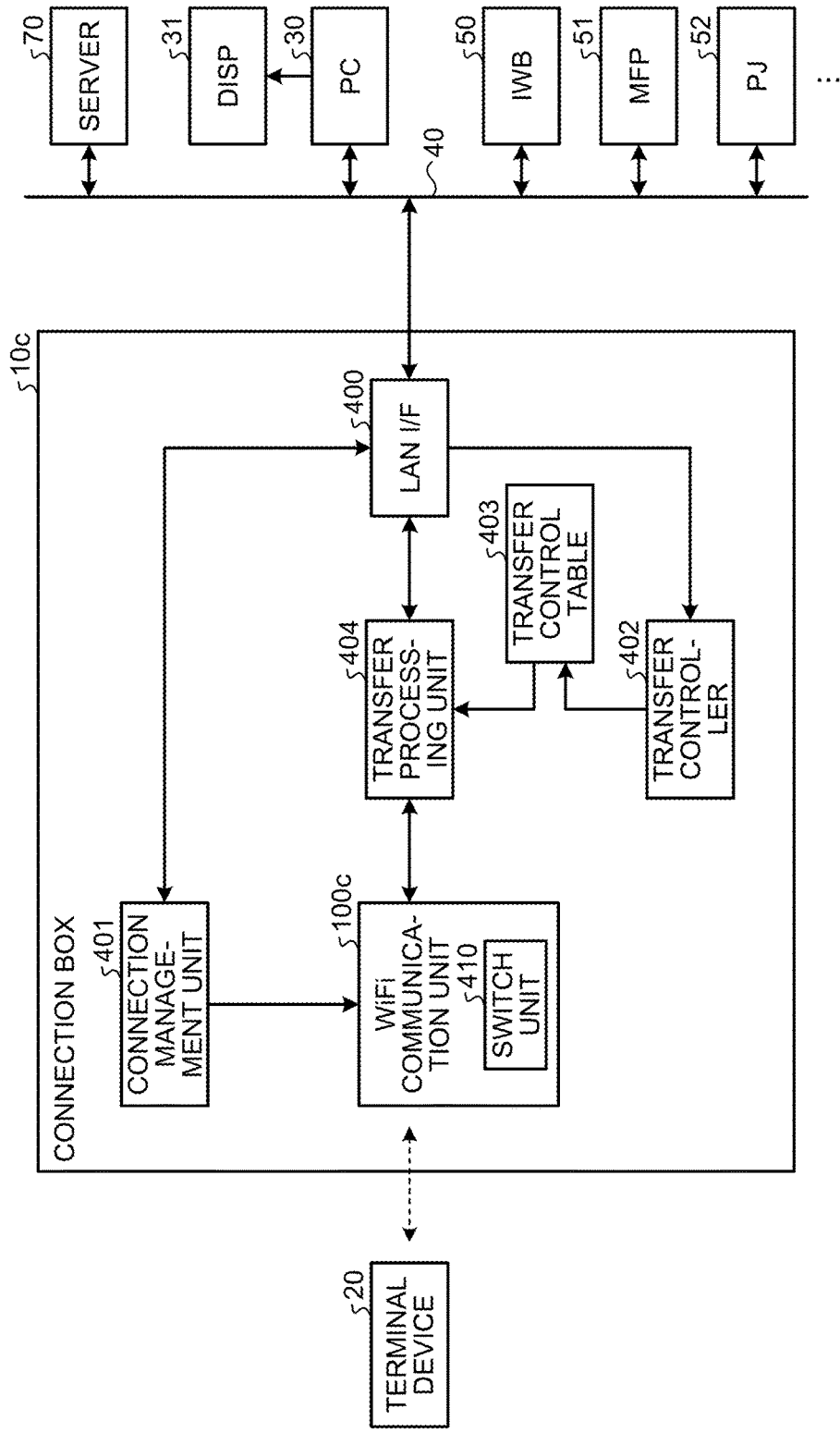
FIG. 9 is a block diagram illustrating the configuration of an example of a connection box according to a second embodiment of the present invention.

FIG. 9 is a block diagram illustrating the configuration of an example of a connection box 10c according to the second embodiment. It should be noted that in FIG. 9, the components in common with those of FIGS. 1 and 3 described above are denoted with the same reference signs and detailed descriptions thereof are omitted. A server 70 manages communication on the LAN 40. Devices connected to the LAN 40 is authenticated by the server 70, thereby being able to communicate via the LAN 40.

In FIG. 9, the connection box 10c includes a Wi-Fi communication unit 100c, a LAN I/F 400, a connection management unit 401, a transfer controller 402, a transfer control table 403, and a transfer processing unit 404. The LAN I/F 400 controls communication with the LAN 40 corresponding to the LAN I/F 104 in FIG. 3. The LAN I/F 400 also performs delivery of data among the transfer processing unit 404, the connection management unit 401, and the transfer controller 402.

The Wi-Fi communication unit 100c corresponds to the Wi-Fi communication unit 100 described with reference to FIG. 3 and basically has the Wi-Fi access point function to perform Wi-Fi wireless communication. The Wi-Fi communication unit 100c is identified by a predefined SSID. The Wi-Fi communication unit 100c also includes a switch (SW) unit 410 for controlling the on/off of the Wi-Fi communication. It should be noted that the switch unit 410 is to have the function to control the on/off of the communication and not to be limited to have a particular configuration.

The connection management unit 401 has the function as a host access point with respect to the Wi-Fi communication unit 100c. The connection management unit 401 performs delivery of a WPA key with the Wi-Fi communication unit 100c in accordance with an instruction given from the PC 30, for example, and controls communication with the LAN 40 via the Wi-Fi communication unit 100c. For example, the connection management unit 401 forwards the WPA key to the Wi-Fi communication unit 100c in accordance with an instruction transmitted from the PC 30. The Wi-Fi communication unit 100c performs authentication using the forwarded WPA key and set the switch unit 410 to the on (closed) state, thereby enabling communication with the LAN 40 via the Wi-Fi communication unit 100c.

The transfer controller 402 corresponds to the OFC described above and generates transfer control information including information indicating the condition of a packet to be processed and the transfer destination of the packet in accordance with the instruction given from the PC 30, for example, and writes the generated transfer control information into the transfer control table 403. The transfer processing unit 404 performs relay of the packet between the Wi-Fi communication unit 100c and the LAN I/F 400. The transfer processing unit 404 corresponds to the OFS described above and controls the behavior of the packet to be relayed in accordance with the transfer control information read out from the transfer control table 403.

Figure 10:
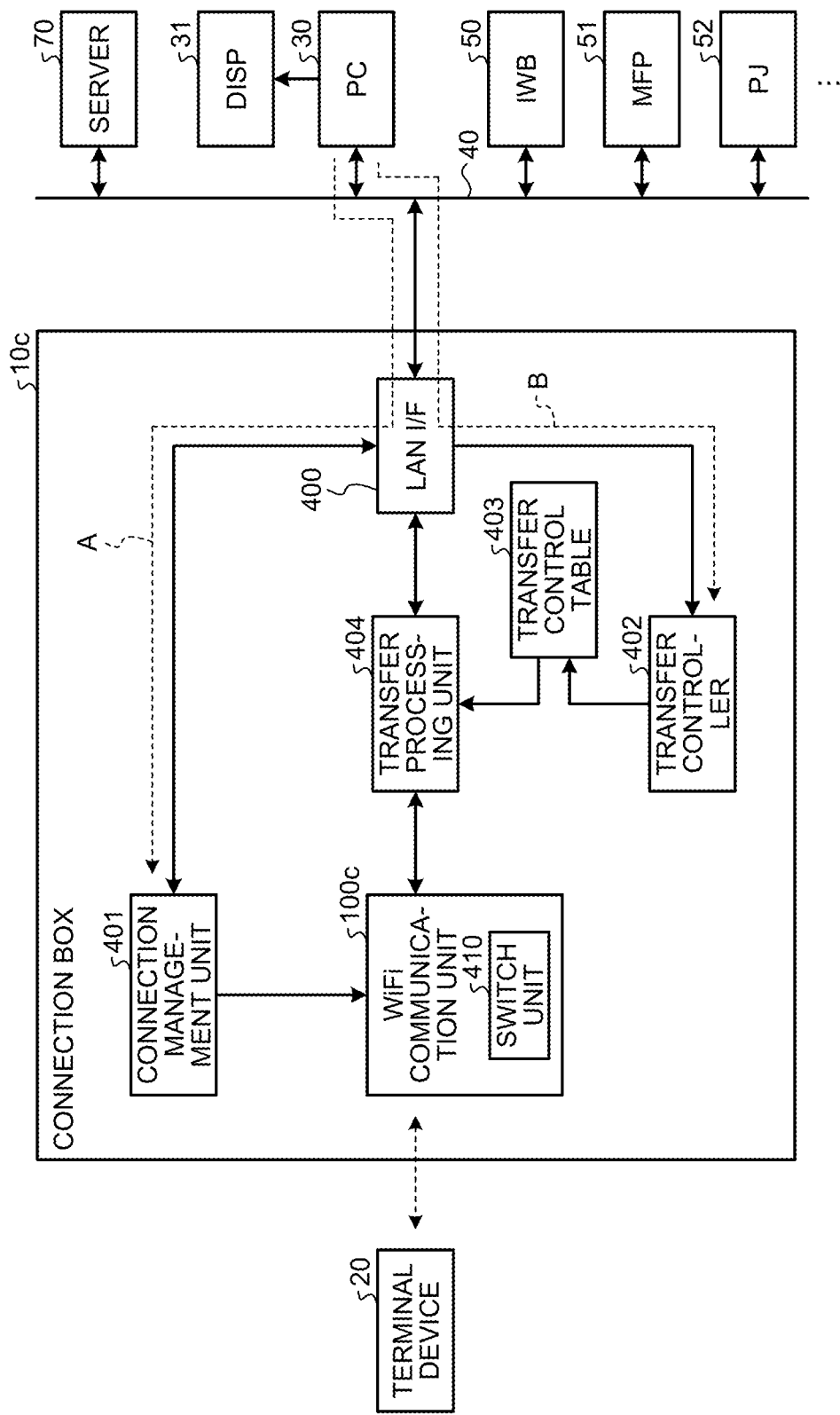
FIG. 10 is a diagram for explaining the flow of processing performed in the connection box according to the second embodiment.

Next, communication using the connection box 10c according to the second embodiment will be described with reference to FIGS. 10 to 14 and FIG. 2 described above. It should be noted that FIG. 10 is a diagram for explaining the flow of processing illustrated in FIG. 9 described above.

Figure 11:
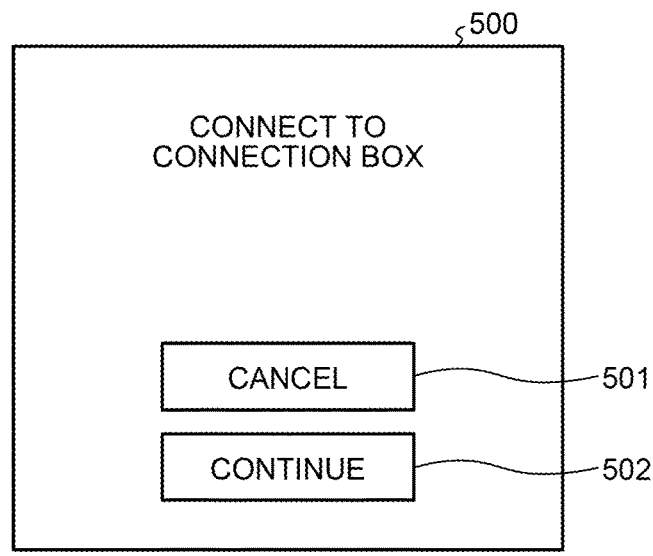
FIG. 11 is a diagram illustrating an example of a connection screen for performing connection to the connection box.

Firstly, connection to the connection box 10c from the PC 30, for example, is established on the inside user side. As an example, the PC 30 accesses the server 70 and requests connection to the connection box 10c. In response to this request, the server 70 presents a connection screen for establishing connection to the connection box 10c to the PC 30. FIG. 11 illustrates an example of this connection screen 500. In the example illustrated in FIG. 11, on the connection screen 500, a button 501 for cancelling connection to the connection box 10c and a button 502 for maintaining connection to the connection box 10c are arranged. The PC 30 transmits information indicating an operated button to the server 70.

Figure 12:
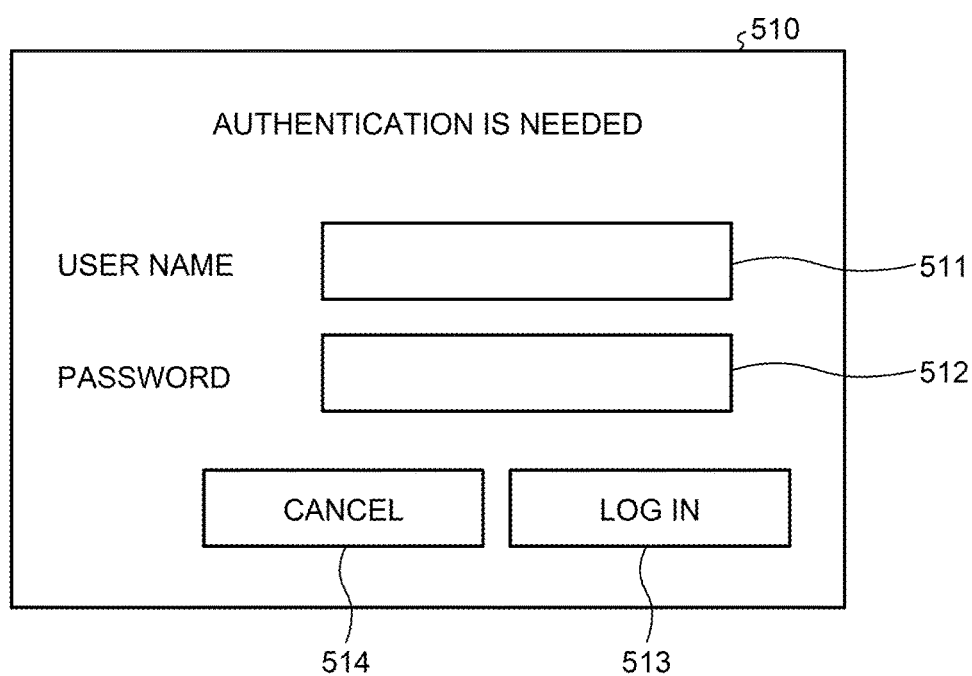
FIG. 12 is a diagram illustrating an example of a log-in screen for performing connection to the connection box.

When information indicating an operation performed on the button 502 is transmitted from the PC 30, the server 70 presents a log-in screen 510 illustrated in FIG. 12 to the PC 30. Input sections 511 and 512 are areas for inputting a user name and a password, respectively. A button 513 is a button for transmitting information input to the input sections 511 and 512 to the server 70. A button 514 is a button for cancelling connection to the connection box 10c.

Upon receiving the user name and the password transmitted from the PC 30 and input on the log-in screen 510, the server 70 performs authentication processing in accordance with the received user name and password. When the authentication is successful, connection via the LAN 40 is established between the PC 30 and the connection box 10c.

When the PC 30 is connected to the connection box 10c, the PC 30 causes the display 31 to display a device designating screen for designating a device that is permitted for connection, as the terminal device 20, via the connection box 10c. The device designating screen may be presented by the server 70 for display.

Figure 13:
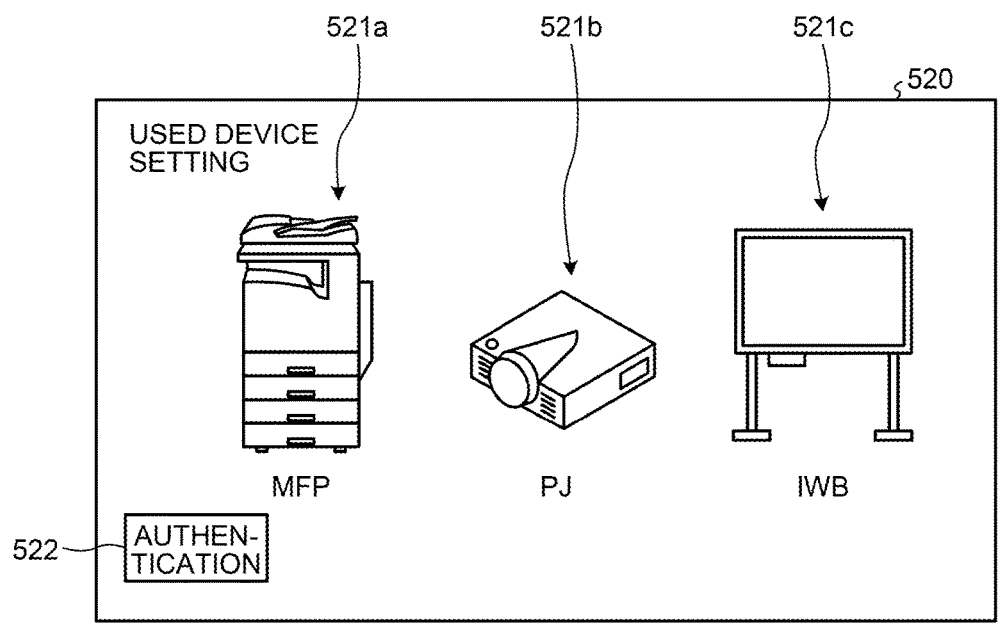
FIG. 13 is a diagram illustrating an example of a device designating screen according to the second embodiment.

FIG. 13 illustrates an example of a device designating screen 520. In the example illustrated in FIG. 13, on the device designating screen 520, devices that can be permitted for connection (an MFP 51, a PJ 52, and an IWB 50) are displayed as icon images 521a, 521b, and 521c. However, the embodiment is not limited to this example and the devices that can be permitted for connection may be presented by texts and displayed in a list.

When the button 522 is operated after a desired icon image is selected from the icon images 521a, 521b, and 521c, the PC 30 transmits the transfer control information of the device corresponding to the selected icon image to the connection box 10c. It should be noted that the transfer control information of each device is stored in advance in the PC 30. However, the embodiment is not limited thereto. The transfer control information of each device may be stored in the server 70 and the PC 30 may acquire the transfer control information of each device by inquiring to the server 70. Furthermore, on the PC 30, a plurality of icon images can be selected from the icon images 521a, 521b, and 521c and the transfer control information of a plurality of devices may be transmitted to the connection box 10c.

The connection box 10c forwards the transfer control information transmitted from the PC 30 to the transfer controller 402 (path B in FIG. 10). The transfer controller 402 writes the forwarded transfer control information into the transfer control table 403.

The terminal device 20 transmits a pre-notified SSID for establishing connection with the Wi-Fi communication unit 100c to the connection box 10c (Step S10 in FIG. 2). It should be noted that in the connection box 10c, the access point function may not involve encryption by WPA or other method, similarly to the first embodiment described above. In this case, the terminal device 20 can establish connection with the Wi-Fi communication unit 100c by transmitting a predetermined SSID to the connection box 10c.

At this stage, because authentication by WPA has not been performed in the Wi-Fi communication unit 100c, the switch unit 410 of the Wi-Fi communication unit 100c is in the off (opened) state. The terminal device 20 thus cannot access any device on the LAN 40.

Next, on the outside user side, the user inputs identification information pre-notified from the inside user side to the terminal device 20. In this process, the terminal device 20 is forced to refer to an identification information input screen on the server 70 by the Captive Portal function via the connection management unit 401 from the Wi-Fi communication unit 100c, for example, and the identification information input screen is displayed on the display of the terminal device 20.

Figure 14:
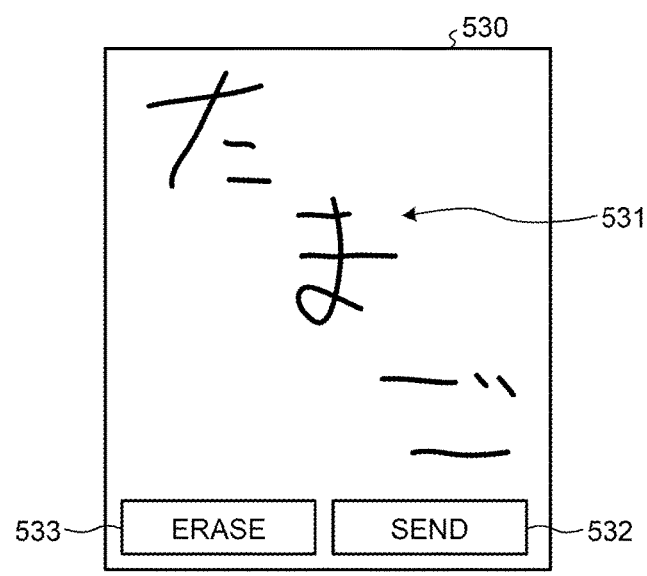
FIG. 14 is a diagram illustrating an example of an identification information input screen according to the second embodiment.

FIG. 14 illustrates an example of this identification information input screen 530. In the example illustrated in FIG. 14, the identification information input screen 530 has a drawing area 531 on which drawing can be performed. The outside user performs drawing prenotified from the inside user on the drawing area 531. The contents to be drawn are not particularly limited and may include a picture, a text, and a sign as long as the outside user and the inside user can share the recognition. When a button 532 is operated on the identification information input screen 530, an image in the drawing area 531 is transmitted to the PC 30, for example. The PC 30 receives the transmitted image and causes the display 31 to display the received image.

On the identification information input screen 530, the contents that have been drawn on the drawing area 531 can be erased by operating the button 533. Furthermore, the identification information input screen 530 is not limited to be used for drawing and may be configured to receive an input of a text as identification information, for example.

On the inside user side, the user on the inside user side checks the image displayed on the display 31 of the PC 30, so that the user on the inside user side can determine whether or not the identification information is correct. Upon determining that the identification information is correct, the user on the inside user side transmits connection permission information indicating connection permission to the connection box 10c, thereby notifying the connection permission at Step S12 in FIG. 2.

The connection box 10c forwards the connection permission information received from the PC 30 to the connection management unit 401 following the path A in FIG. 10. The connection management unit 401 forwards the WPA key to the Wi-Fi communication unit 100c in accordance with the forwarded connection permission information. The Wi-Fi communication unit 100c performs authentication processing by WPA using the key forwarded from the connection management unit 401 to turn on (close) the switch unit 410.

With this process, the terminal device 20 is connected to the LAN 40 via the connection box 10c. Because the connection box 10c is authenticated by the LAN 40, the terminal device 20 now can access various devices connected to the LAN 40 via the connection box 10c (Step S13 in FIG. 2).

In this state, because the communication from the terminal device 20 to the LAN 40 is performed via the relay of the transfer processing unit 404, communication from the terminal device 20 to various devices on the LAN 40 is controlled in accordance with transfer control information stored in the transfer control table 403. For example, when transfer control information corresponding to the IWB 50 is stored in the transfer control table 403, the transfer processing unit 404 sets the transfer destination of the packet transmitted from the terminal device 20 to the IWB 50.

According to the second embodiment, because OpenFlow is applied to the construction according to the first embodiment described above, a system can be structured more flexibly and easily in which a person inside the organization determines whether or not to permit connection between the terminal device 20 and the LAN 40 based on pre-notified identification information input by a person outside the organization.

Modification of the Second Embodiment

Next, a modification of the second embodiment will be described. In the second embodiment described above, the Wi-Fi communication unit 100c, the LAN I/F 400, the connection management unit 401, the transfer controller 402, the transfer control table 403, and the transfer processing unit 404 constructing the connection box 10c have been explained as implemented in a single housing, the embodiment is not limited to this example. More specifically, part of the Wi-Fi communication unit 100c, the LAN I/F 400, the connection management unit 401, the transfer controller 402, the transfer control table 403, and the transfer processing unit 404 can be arranged separately.

Figure 15:
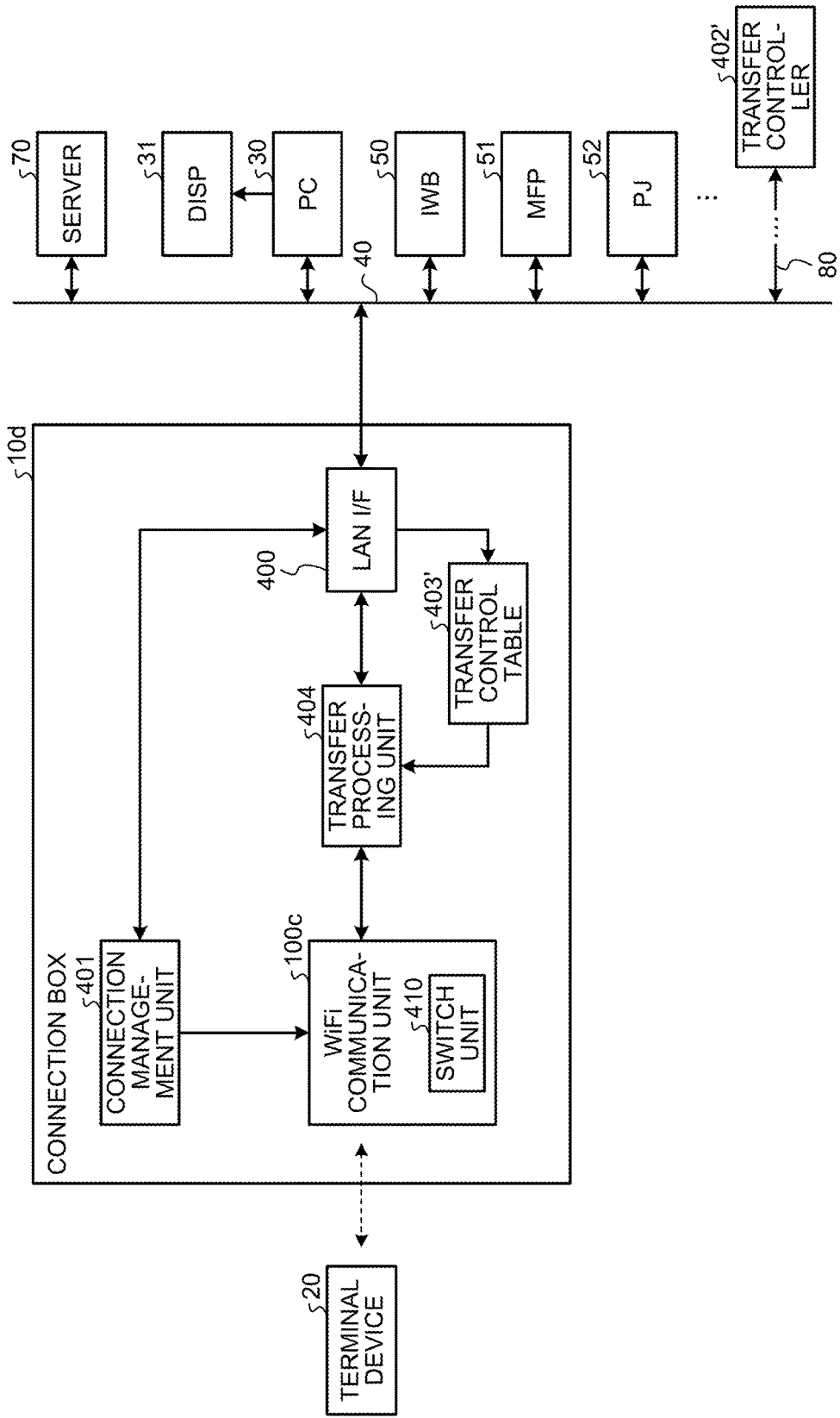
FIG. 15 is a block diagram illustrating the configuration of a communication system according to a modification of the second embodiment.

FIG. 15 illustrates the configuration of an example of communication system according to the modification of the second embodiment. FIG. 15 is an example in which the transfer controller 402 out of the components of the connection box 10c described above is separated to the outside. It should be noted that in FIG. 15, the components in common with those of FIG. 9 described above are denoted with the same reference signs and detailed descriptions thereof are omitted.

In FIG. 15, a connection box 10d includes the Wi-Fi communication unit 100c, the LAN I/F 400, the connection management unit 401, the transfer control table 403', and the transfer processing unit 404. A transfer controller 402' is arranged on another network 80 connected to the LAN 40, for example. The transfer controller 402' may be arranged in a single server apparatus or arranged in a distributed manner in an information processing system including one or more information processing apparatuses.

In this case, the transfer controller 402' receives an instruction from the PC 30 via the LAN 40 and the network 80 and generates transfer control information in accordance with the received instruction. The transfer controller 402' transmits the generated transfer control information to the connection box 10d via the network 80 and the LAN 40. In the connection box 10d, the transfer control information transmitted from the transfer controller 402' is written into the transfer control table 403' via the LAN I/F 400.

As described above, with the concept of SDN applied to the communication system according to the embodiment, part of the construction of the connection box according to the embodiment can be separated. This enables flexible design of the system construction as well as cost reduction of the connection box.

The present invention achieves an advantageous effect of making it possible to easily connect an information processing device of a user outside an organization to a network inside the organization with security ensured.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication system comprising:
   a memory having computer readable instructions stored thereon; and
   at least one processor configured to execute the computer readable instructions to,
   establish a wireless connection to communicate with a terminal device of an outside user via a wireless network using a connection device,
   establish a private connection to communicate with a private network using the connection device, the connection device being connected to the private network,
   control, upon establishing the wireless connection and the private network connection, opening and closing of a first connection between the wireless connection and the private connection,
   request the outside user to input first identification information by displaying an input screen in response to the establishing of the wireless connection between the connection device and the terminal device of the outside user by the connection device, the terminal device not being allowed to communicate with the private network directly, the first identification information being information designated by an inside user to allow the outside user to access the private network and being communicated by the inside user to the outside user, close the first connection between the wireless connection and the private network connection for the outside user based on the input first identification information, the closed first connection enabling the terminal device of the outside user to connect to the private network via the connection device, store in the memory in advance a connection destination communicable with the terminal device via the private network, and transmit information transmitted from the terminal device to the private network to the stored connection destination when the first connection is closed, and the terminal device communicates with the private network via the connection device.

2. A communication method comprising:

establishing, using at least one processor, a wireless connection to communicate with a terminal device of an outside user via a wireless network using a connection device;

establishing, using the at least one processor, a private connection to communicate with a private network using the connection device, the connection device being connected to the private network;

controlling, using the at least one processor, upon establishing the wireless connection and the private network connection, a first connection between the wireless connection and the private connection by opening or closing the connection;

requesting, using the at least one processor, the outside user input first identification information by displaying an input screen in response to the establishing of the wireless connection between the connection device and the terminal device of the outside user by the connection device, the terminal device not being allowed to communicate with the private network directly, the first identification information being information designated by an inside user to allow the outside user to access the private network and being communicated by the inside user to the outside user;

closing, using the at least one processor, the first connection between the wireless connection and the private network connection for the outside user based on the input first identification information, the closed first connection enabling the terminal device of the outside user to connect to the private network via the connection device;

storing, using the at least one processor, in memory in advance a connection destination communicable with the terminal device via the private network; and transmitting, using the at least one processor, information transmitted from the terminal device to the private network to the stored connection destination when the first connection is closed, and the terminal device communicates with the private network via the connection device.

3. A communication system comprising:

a connection device; and an authentication device, wherein the connection device includes, a first memory having first computer readable instructions stored thereon, and at least one first processor configured to execute the first computer readable instructions to, establish a wireless connection to communicate with a first terminal device of an outside user via a wireless network, establish a private connection to communicate with a private network, the connection device being connected to the private network, control, upon establishing the wireless connection and the private network connection, opening and closing of a first connection between the wireless connection and the private connection, request the outside user to input first identification information by displaying an input screen in response to the establishment of the wireless connection between the connection device and the first terminal device of the outside user by the connection device, the first terminal device not being allowed to communicate with the private network directly, the first identification information being information designated by an inside user to allow the outside user to access the private network and being communicated by the inside user to the outside user, close the first connection between the wireless connection and the private network connection for the outside user based on the input first identification information, the closed first connection enabling the first terminal device of the outside user to connect to the private network via the connection device, store in the first memory in advance connection destination information indicating a connection destination for the first terminal device to communicate with via the private network, and transmit information from the first terminal device to the private network to the stored connection destination when the first connection is closed, and the first terminal device communicates with the private network via the connection device.

4. The communication system according to claim 3, wherein when an instruction is received to open the first connection, the at least one first processor is further configured to delete at least the first identification information from the first memory.

5. The communication system according to claim 3, wherein the at least one first processor is further configured to:

add the connection destination information to the transmitted information that is transmitted from the first terminal device to the private network.

6. The communication system according to claim 3, wherein the at least one first processor is further configured to:

generate different pieces of second identification information respectively for a plurality of terminal devices connected to the wireless network;

store in the first memory the first identification information transmitted from the first terminal device and the generated second identification information with respect to the first terminal device in an associated manner; and acquire the first identification information and the second identification information associated with the first identification information from the first memory to cause a display device to display the acquired first identification information and second identification information.

7. The communication system according to claim 1, wherein the private network includes at least one of an interactive whiteboard, a multifunction printer (MFP), a personal computer, a projector, an access point, and a tablet.

8. The communication system according to claim 1, wherein the first identification information is set to include a desired user input by the inside user.

9. The communication system according to claim 1, wherein the terminal device is communicably connected to a connection destination stored in the memory when the first connection is closed.

10. The communication system according to claim 1, wherein the terminal device is not authenticated by the private network prior to the closing of the first connection.

11. The communication system according to claim 1, wherein the at least one processor is further configured to:
display on a display device the input first identification information to the outside user to determine whether the first connection is to be opened or closed;
receive an instruction that indicates whether to open or close the first connection from the outside user responsive to the display of the input first identification information; and
close the first connection between the wireless connection and the private network connection based on the instruction.

12. The communication system according to claim 1, wherein the connection device includes an access point for the wireless connection, and the at least one processor is further configured to establish the wireless connection to communicate with the terminal device which accesses the access point of the connection device.

13. The communication method according to claim 2, the method further comprising:
displaying, using the at least one processor, on a display device the input first identification information to the outside user to determine whether the first connection is to be opened or closed;
receiving, using the at least one processor, an instruction that indicates whether to open or close the first connection from the outside user responsive to the display of the input first identification information; and
closing, using the at least one processor, the first connection between the wireless connection and the private network connection based on the instruction.

14. The communication method according to claim 2, wherein
the connection device includes an access point for the wireless connection; and
the method further comprises,
establishing, using the at least one processor, the wireless connection to communicate with the terminal device which accesses the access point of the connection device.

15. The communication system according to claim 3, wherein the authentication device includes:
at least one second memory having second computer readable instructions stored thereon; and
at least one second processor configured to execute the second computer readable instructions to,
display on a display device the input first identification information to the outside user to determine whether the first connection is to be opened or closed,
receive an instruction that indicates whether to open or close the first connection from the outside user responsive to the display of the input first identification information, and
close the first connection between the wireless connection and the private network connection based on the instruction.

16. The communication system according to claim 3, wherein
the connection device includes an access point for the wireless connection; and
the at least one first processor is configured to:
establish the wireless connection to communicate with the first terminal device which accesses the access point of the connection device.

17. The communication system according to claim 1, wherein when an instruction is received to open the first connection, the at least one processor is further configured to delete at least the first identification information from the memory.

18. The communication system according to claim 1, wherein the at least one processor is further configured to:
generate different pieces of second identification information respectively for a plurality of terminal devices connected to the wireless network;
store in the memory the first identification information transmitted from the terminal device and the generated second identification information with respect to the terminal device in an associated manner; and
acquire the first identification information and the second identification information associated with the first identification information from the memory to cause a display device to display the acquired first identification information and second identification information.

19. The communication method according to claim 2, the method further comprising:
when an instruction is received to open the first connection, deleting, using the at least one processor, at least the first identification information from the memory.

20. The communication method according to claim 2, the method further comprising:
generating, using the at least one processor, different pieces of second identification information respectively for a plurality of terminal devices connected to the wireless network;
storing, using the at least one processor, in the memory the first identification information transmitted from the terminal device and the generated second identification information with respect to the terminal device in an associated manner; and
acquiring, using the at least one processor, the first identification information and the second identification information associated with the first identification information from the memory to cause a display device to display the acquired first identification information and second identification information.

21. The communication method according to claim 2, wherein the terminal device is not authenticated by the private network prior to the closing of the first connection.

* * * * *